Feb. 18, 1964  J. J. TIPPMANN  3,121,559
RECUPERATORS
Filed May 28, 1957  3 Sheets-Sheet 1
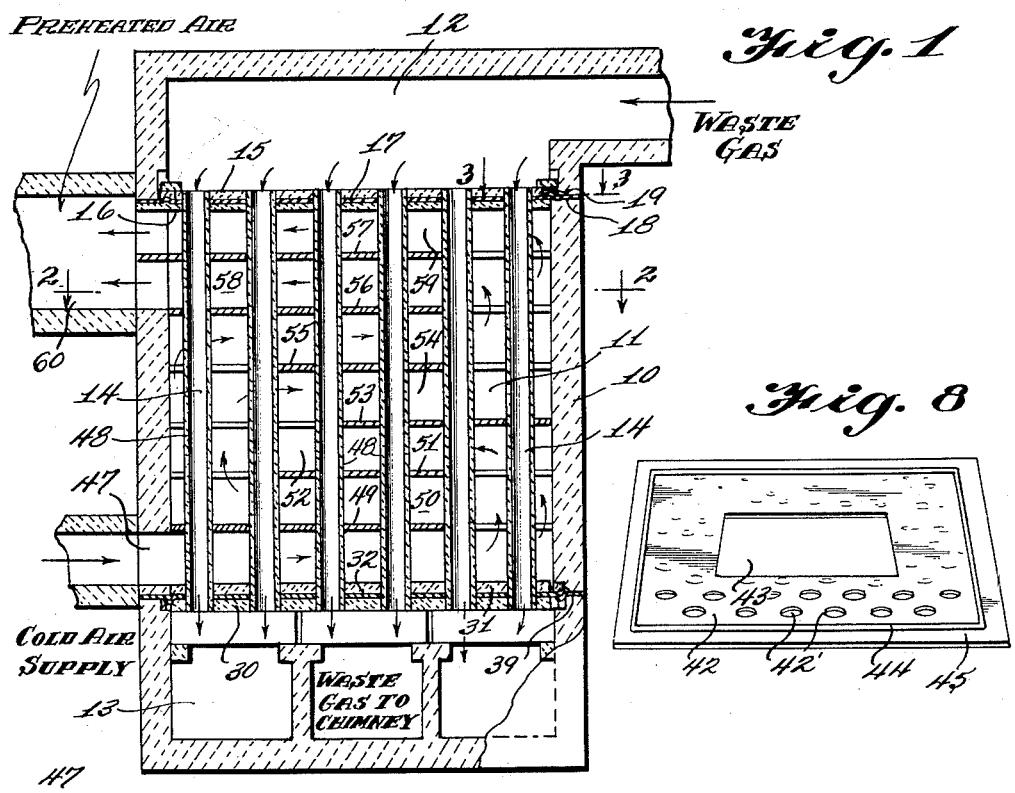
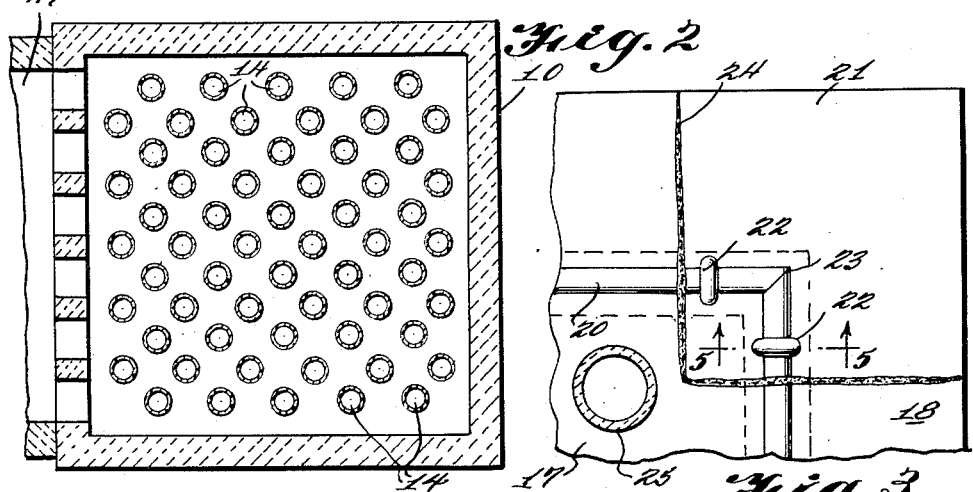
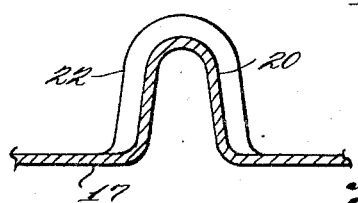
INVENTOR
JOSEPH J. TIPPMANN
BY Stone & Mack
ATTORNEYS

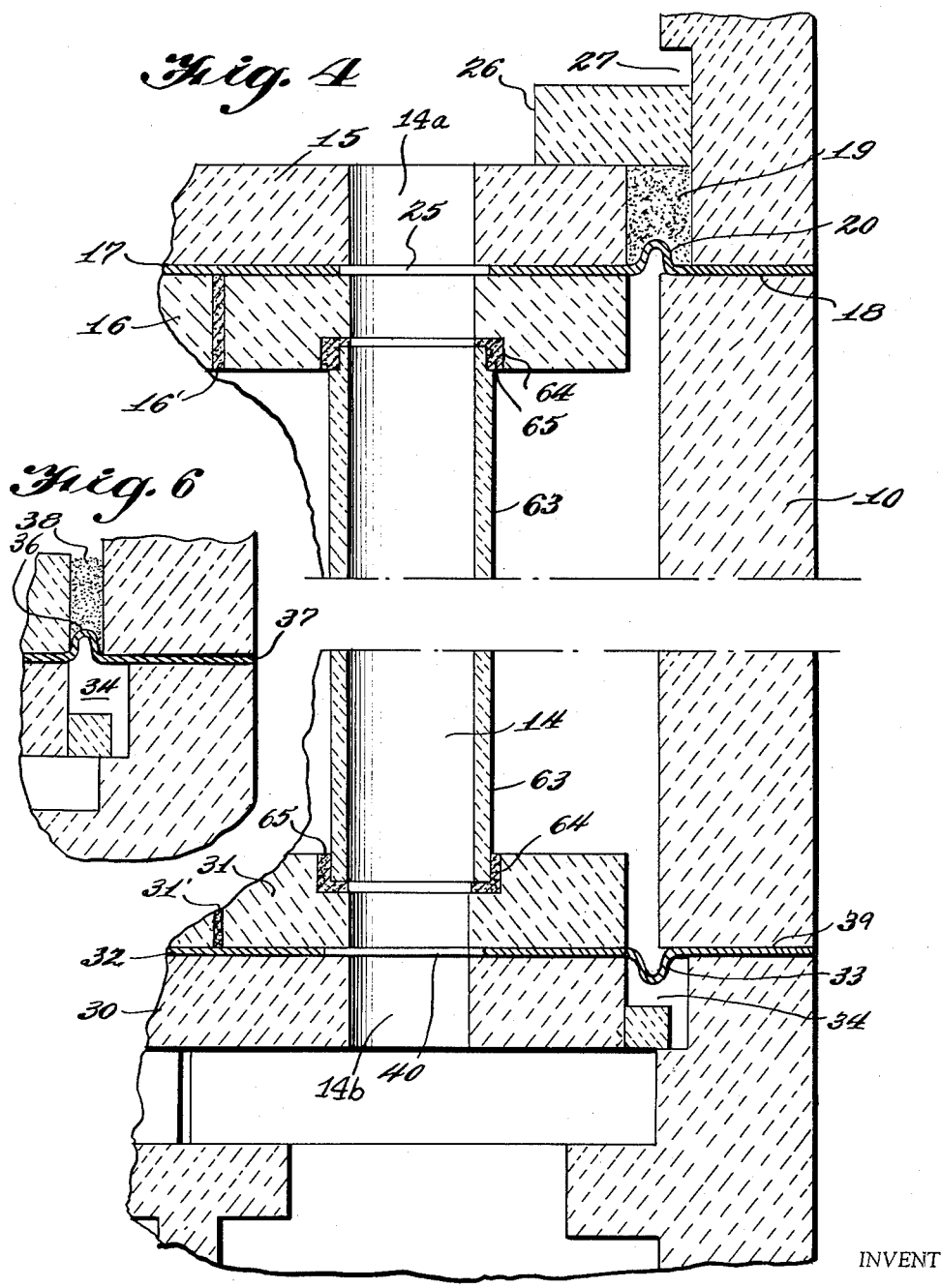

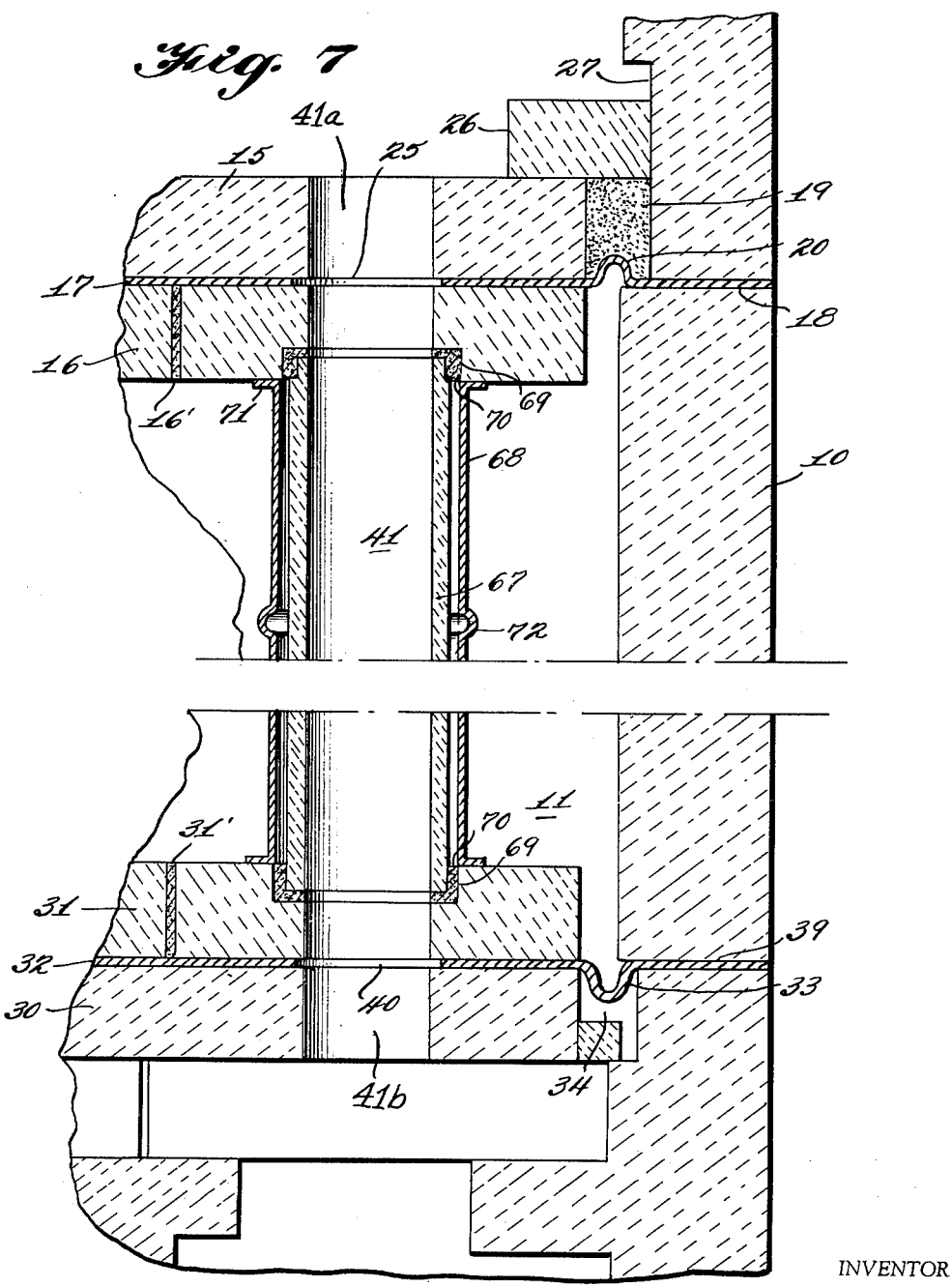

United States Patent Office 3,121,559
Patented Feb. 18, 1964

3,121,559
RECUPERATORS
Joseph J. Tippmann, 3319 Piedmont Ave., Pittsburgh, Pa.
Filed May 28, 1957, Ser. No. 662,064
2 Claims. (Cl. 263—20)

This invention relates to improvements in refractory recuperators of the type in which a high temperature gaseous fluid is brought into indirect heat exchange relationship with a gaseous fluid at a lower temperature for purposes of thermal exchange. More particularly, the invention relates to improvements in refractory ceramic-lined recuperators or preheaters mainly of the type in which waste or exhaust gases discharged from a chemical or metallurgical furnace flow on one side of a heat-transferring refractory wall, and combustion air flows on the other side and is heated on its way to the furnace.

In recuperators, as distinct from regenerators, separate passages are provided for the high temperature gases, and for the lower temperature gas to be heated by the high temperature gases. Waste gases at temperatures ranging from 900° F. to as high as 2500° F., and air for combustion are simultaneously circulated on opposite sides of a refractory tile or suitable ceramic wall to preheat the air by transfer of heat through the wall. In the more recent types of recuperators, tile ducts or flues are provided for conducting one of the gaseous fluids through a chamber through which the other gaseous fluid simultaneously passes, to thereby obtain a thermal interchange. The ducts pass through openings in end walls for the chamber and connect an entrance passage to an exit passage for one of the gaseous fluids. These end walls are constructed of one or more layers of tile or other ceramic material which form a refractory dividing wall between each of the above-mentioned passages respectively, and the chamber.

In recuperators, as heretofore constructed, with tile or fire clay materials for forming the passages, the walls separating the passages are found to be inadequate in preventing losses of air or other gases or intermingling thereof, particularly with the high temperatures and pressure differentials existing inside a recuperator under certain conditions of operation. A large number of individual refractory pieces are assembled in building a recuperator unit, and are held together by mortar joints that are not leakproof. Leakage of air to the waste gas stream, or waste gas infiltrations to the air stream result, depending on pressure differentials.

Industrial furnace installations provided with the types of recuperators hereinafter described generally operate with a large air loss to the waste gas stream primarily because of the air pressure employed which forces the air through a dividing wall into the waste gas stream passing to the stack. When cracks occur, and as they in time become wider, the air loss becomes still greater, thus causing greater reduction in efficiency of the system in which the recuperator is employed.

A main object of the present invention is to provide improvements in means in a recuperator of the types referred to herein, whereby intermingling of separately circulating gases, or loss of air, is highly effectively prevented.

In the present invention a recuperator is built and constructed to include improved gas-impervious means associated with a refractory ceramic or fire clay wall on either side of which, gases are separately circulated for thermal exchange. More particularly, an impervious refractory, metal layer and a refractory, ceramic layer are supported adjacent each other to form a dividing or heat-transferring wall in a recuperator whereby leakage through the wall is substantially diminished or completely eliminated.

The various features of novelty which characterize the present invention are set forth with particularity in the following description and in the claims annexed thereto. For purposes of illustration, reference is made to the accompanying drawings in which:

FIG. 1, shows, more or less diagrammatically, a vertical transverse section of a recuperator of the type in which combustion air is preheated in a chamber in indirect heat exchange relationship with high temperature waste gas passing through flues in said chamber, with a preferred form of improved means embodied in the invention;

FIG. 2 is a horizontal section of the recuperator shown in FIG. 1, taken on line 2—2 in the direction of the arrows;

FIG. 3 is an enlarged fragmentary, sectional view taken on line 3—3 in FIG. 1, showing a plan view of a fragment of the preferred form of a metal layer installation for a recuperator;

FIG. 4 is a vertical sectional view of a fragment of the recuperator shown in FIG. 1, showing an enlargement of details of the metal layer installations and associated structures;

FIG. 5 is an enlarged fragmentary sectional view taken on line 5—5 of FIG. 3, in the directions of the arrows;

FIG. 6 is a fragmentary sectional view of a modified structure including a metal layer installation and associated means;

FIG. 7 is a vertical sectional view of a modification showing in addition to the features of FIG. 4, by way of example, sections of a flue of the recuperator encased in a metal layer that surrounds said sections; and FIG. 8 is a perspective view of a modified metal layer for installation in a recuperator.

Referring to FIG. 1 in the drawing, the invention is shown applied to a recuperator of a type in which high temperature waste gases from a metallurgical furnace are used to preheat air for combustion in the furnace. In the structure illustrated, 10 indicates an outer refractory ceramic wall of a recuperator forming the sides of a chamber 11. The chamber 11 is provided with an upper wall and a lower wall, each forming a dividing wall between the chamber 11, and, respectively, an entrance passage 12 for waste furnace gas above the upper wall, and an exit passage 13 below the lower wall leading to a chimney (not shown). A plurality of open-ended refractory ducts or flues 14 connect the entrance passage 12 to the exit passage 13 and pass through the chamber 11.

In connection with the present invention, a dividing wall in a recuperator is considered to be a refractory layer or refractory layers between passages for separate and simultaneous circulation of high temperature gas and of lower temperature gas for thermal exchange between the gases. The term "dividing wall" is herein construed to include the refractory wall forming a duct or flue, as well as a wall such as the upper and lower walls referred to above.

Under certain conditions of operation, and in certain parts or sections in a recuperator, depending on the position and structure of a dividing wall, penetration of a gas through a fire clay or tile layer and through joints ordinarily employed for such purpose, is likely to occur to a varying degree. In any given structure in a dividing wall, and in a given manner of recuperator operation, penetration and leakage are usually found to occur more in some sections than in others. In the improved structure of the present invention, an impervious, refractory metal layer is included in a dividing wall. The metal layer permits transfer of heat and prevents penetration and leakage.

In certain instances, penetration and leakage are prevented to an appreciable and satisfactory extent by including a refractory metal layer in either the upper or lower wall, previously referred to, or in both, completely coextensive, or coextensive in part with a refractory ceramic layer. In other instances, the provision of a metal layer in the walls of the flues accomplishes certain results. In still further instances of recuperator operation, a refractory metal layer is provided in all parts of walls that divide passages for high temperature gas from passages for lower temperature gas. The positioning of the metal layer on one or the other side of a ceramic layer or between ceramic layers, in a dividing wall is advantageous, depending also on the construction and manner of operation of the recuperator.

More specifically, and as illustrated in the drawings, by way of example, the recuperator of the type referred to in connection with FIG. 1, has an upper dividing wall that has a top tile seal 15, a top baffle tile layer 16, and a refractory metal layer 17 therebetween. The metal layer 17 is completely coextensive with the two tile layers 15 and 16 across the mortar joints 16' (FIG. 4) and the joints ordinarily provided for thermal expansion of the tile layers in the usual recuperator unit, and extends further, part of the way, into the surrounding side wall 10 of the chamber 11, or preferably completely through the wall. The border portion 18 of the metal layer 17 may, if desired, be cemented in the wall 10 with refractory mortar or cement.

Within the border portion 18 of the metal layer 17, adjacent the wall 10, and in a recess 19 (FIGS. 1, 4 and 7) provided for horizontal expansion of the tile layers 15 and 16, the layer 17 has an expansion bend 20 to allow for the expansion and contraction of the metal. This bend 20 (FIGS. 1, 3, 4, 5 and 7) in the layer 17 extends continuously around the inner or central portion thereof adjacent the border portion 18. In FIG. 3, a plan view of one corner portion of a metal layer 17 is shown as it appears in a recuperator having a side wall 10, the horizontal section of which is rectangular, as shown in FIG. 2. Each of the other corner portions is of similar construction and a section 21 thereof may be prepared separately from the rest of the layer. To allow for expansion longitudinally of a ridge formed by the bend 20, an expansion bend 22 is formed in the metal layer 17 across the ridge formed by the bend 20. A bend 22 may be provided in each side of the rectangle formed by the bend 20, and adjacent each angle 23. The corner sections 21 are welded to the main portion of the layer 17 as shown at line 24 (FIG. 3) to form an imperforate connection.

The impervious, heat-resistant metal layer 17 is provided with openings 25 wherever openings appear in the tile layers 15 and 16 at the ends of the flues 14.

The expansion bend 20 in the metal layer 17 turns upwardly into the recess 19. The space in this recess above the bend 20 is preferably filled with loose silica sand, or its equivalent, to cover the bend 20 and to protect it from the effects of direct flame impingement and exposure to waste gas at high temperatures. For further protection, a refractory tile heat shield 26 is placed across the opening into the recess 19. A wall recess 27 above the shield 26 is provided for vertical expansion.

The bottom wall of the chamber 11 in the recuperator of the type shown in FIG. 1, has a bottom tile seal 30, a bottom baffle tile layer 31 with its mortar joints such as that shown at 31', and a refractory metal layer 32 between the tile layers 30 and 31. The metal layer 32 is similar, in construction and design, to the above-described metal layer 17 except that the expansion bend 33 usually dips downwardly into a recess 34, that corresponds to the recess 19, for horizontal expansion. Sand may or may not be placed in the recess 34, depending on the operation of the recuperator. When sand is used to protect the expansion bend in the metal layer 32, the bend is inverted from that shown at 33. As shown in FIG. 6, as thus modified, the expansion bend 36 in the metal layer 37 of the bottom wall is directed upwardly into the space above the recess 34, and loose silica sand 38 is placed in the said space.

As in the case of the metal layer 17, the metal layer 32, preferably extends into the wall 10. The border portion 39 of the metal layer 32, FIGS. 4 and 7, is shown extending through the wall. The metal layer 32, is also provided with openings, such as at 40, wherever openings appear in the tile layers 30 and 31 at the bottom ends of the flues 14 (FIG. 4) and 41 (FIG. 7).

As indicated hereinabove, and as illustrated in FIG. 8, the metal layer employed in the upper or lower walls of the chamber 11 (FIG. 1) or both, instead of extending completely across, may extend inwardly part of the way. The metal layer 42 therefore has a central opening 43 and openings 42' for flues. An expansion bend 44 is provided for the purpose described, and an outer portion 45 is extended, as desired, into or through a side wall of a recuperator chamber.

In the type of recuperator illustrated in FIGS. 1 and 2, an air inlet 47 is provided to admit air to be heated, into one side of the chamber 11 at a lower level adjacent the lower wall comprising the bottom baffle tile layer 31, the seal tile layer 30, and the metal layer 32. Baffles, of refractory material, are arranged in the chamber 11 to direct air in a circuitous path for uniform heating by contact with the outer surfaces of the walls 48 of the flues 14. The air proceeds generally in a zig-zag path and upwardly, countercurrent to the direction of flow of the hot waste gas in the flues 14.

In the arrangement shown in FIG. 1, a plurality of baffles, each at a different level, are placed horizontally in the chamber 11. Air blown into the chamber 11 through the inlet 47 at one side proceeds toward the opposite side around, and in contact with, the outer surfaces of the walls of the sections of the flues 14 between the bottom baffle tile layer 31 and a tile baffle 49. The baffle 49 extends from the inlet 47, part of the way across the chamber 10, leaving an opening adjacent the side wall 10 to permit passage of air upwardly into a space 50 between the baffle 49 and a tile baffle 51 next above. The baffle 51 is spaced from the air inlet side of the chamber 11 and from the opposite side, permitting the circulating air to pass upwardly around both ends of the baffle 51 into a space 52 between the latter baffle and a tile baffle 53 next above. The baffle 53 extends from the chamber wall shown on the right, part of the way across, toward the air inlet side, leaving an opening there for further upward passage of the air into a space 54 between the baffle 53 and a tile baffle 55 thereabove. The baffle 55 and a tile baffle 56 next above, are respectively in substantially the same position in relation to the side wall of the chamber 11, and of substantially the same dimensions, as baffles 51 and 49. The baffle 56, and a tile baffle 57 between the baffle 56 and the top baffle tile layer 16 form divided passages 58 and 59 in which the divided streams of air circulate in contact with the walls of initially heated upper portions of the flues 14, and finally through a hot air outlet 60 for use in combustion in a furnace (not shown).

The walls 48 of the flues 14, as shown in FIG. 1, consist of a refractory ceramic material. Such walls, as shown in FIG. 4, are preferably built with sections of hollow-tile 63. The sections 63 forming a flue 14 are placed in alignment. Each section 63 is held in place in a space between baffles. Each end of a section 63 is set in a recess 64 in a baffle tile. A mortar joint 65 for each end is also provided. The end passages 14a and 14b through the tile layers 15 and 16, and 30 and 31, respectively, form continuations of the duct or flue 14.

As indicated hereinabove, under certain conditions of industrial operation and with certain structures, particularly when high air pressures are employed, the air losses are or become unduly large. Large air losses under such conditions can occur in recuperators having ducts, through joints, or through ceramic walls of ducts, depending on the porosity of the ceramic material used, and particularly when cracks develop or pieces of tubes fall out. To prevent such losses, the walls of flues may be constructed of a layer, or layers, of refractory ceramic material and a solid layer of refractory metal. For substantially complete prevention or avoidance of air leakage a recuperator structure such as that shown is provided in which the walls of a recuperator chamber as well as the walls of flues are constructed of combined layers of refractory ceramic material and refractory metal.

FIG. 7 illustrates a flue wall structure that is included in a recuperator of a type previously described. Specifically, this structure is included in that shown and described in my copending application Serial No. 662,201, filed concurrently herewith, on May 28, 1957, and now abandoned. FIG. 7, also specifically illustrates a recuperator structure in which a metal layer is included in the top and bottom walls of a recuperator chamber 11, as well as in the wall of a flue 41.

The wall of the duct 41 comprises a refractory ceramic layer 67 and an impervious layer of heat-resistant metal 68. In the case of a recuperator in which hot waste gases are passed through a duct and in which air is in contact with the outside of a duct a heat-resistant ceramic layer is employed as an inner layer, as shown. In a recuperator in which air is passed through a duct and hot waste gases are circulated in contact with the outside of a duct, a ceramic layer is employed as an outer layer. In a duct wall the metal layer is contiguous wtih and coextentive with the ceramic layer. The ceramic layer 67, which is preformed and in the shape of a tube, is inserted in a metal tube which forms the outer metal layer 68. The outer diameter of the ceramic tube is preferably only slightly less than the inner diameter of the metal tube. The duct thus formed, preferably in sections, is held in place in a recuperator chamber between tile supporting means for a duct at each end. For example, as shown, the ends of the ceramic tube 67 are positioned in a recess as at 69 with a mortar joint 70 in the tile baffle 16. The ends of the metal tube 68 may or may not have a flange. With a flange 71, as shown, an end of the tube 68 is fitted against the surface of the tile baffle 16, and mortar applied, if desired. The end passages 41a and 41b through the tile layers 15 and 16, and 30 and 31, respectively, form continuations of the duct or flue 41.

An expansion bend 72 is provided in the tubular metal layer 68, between the ends of the tube, to allow for expansion and contraction and to prevent buckling.

The metal layer employed in a dividing wall, as described, for a recuperator, may be of any thickness that renders it practical, and economically feasible, and capable of being handled without danger of puncturing it too readily in the course of constructing a recuperator chamber. The metal layers may be formed of flexible metal sheeting or more rigid metal plate. Any of various grades of steel, or alloy steels are serviceable. Where cost is not considered a major item, a refractory metal that is more resistant to corrosion, such as a nickel-chromium alloy, may be employed. With a layer of refractory ceramic material, such as tile or fire clay, as used in hollow tile or furnace tile in recuperator settings, or in block form, and resistant to flame temperatures, such a layer serves to protect the metal layer against corrosion and the effects of extremely high temperatures.

There are a number of important advantages that are realized in the application of the present invention. Instead of operating recuperators with pressures of air or other gaseous media at a low value as heretofore (approximately 7 in. water gauge maximum), air pressure, for instance, on the air side of a dividing wall, including the recuperator tubes, can be increased to give a higher working pressure at the recuperator outlet without appreciable losses of air to the waste gas side of the recuperator. The increased air pressure available at the outlet of the recuperator provides a higher air pressure at the burners, which results in increased burner efficiency and consequently better furnace performance. Furthermore, the increased air pressure available at the burner provides conditions for establishing a wider variety of flame characteristics that can be developed by a burner for use in a furnace. The flame can be varied from a reducing type flame through the neutral range to an oxidizing flame, and provision can be made for the use of a tempered flame burner.

In addition to the above advantages, it is notable that stack drafts can be increased, by the use of the improved recuperator structures herein described, without a resultant loss in air due to leakage through a dividing wall. Increase of both the air pressure and stack draft makes possible the establishment of a wide variety of conditions within a furnace, thereby increasing furnace efficiency as well as providing for the use of a wider range of heat-treating conditions.

A continuous metal seal in a recuperator structure, as described above, furthermore, makes possible the use of fans of smaller volume, which results in a saving in the cost of a unit and in a considerable reduction in the cost of operation due to a reduction in horsepower requirements. Heretofore, a fan and power unit of approximately twice a normal requirement to offset air losses in a recuperator in course of operation and with increase in age, was considered necessary. Recuperator units themselves may be reduced in size since with the improved structure a smaller volume of air is needed for passage through a recuperator for preheating in a given operation. Decrease in recuperator size results in saving of space, particularly mill floor space, and in size and maintenance of plants. Also, various types of recuperators in which the metal sealing means is used, can be adapted to industrial uses to which they were not heretofore adaptable.

What is claimed is as follows:

1. In a recuperator having a refractory ceramic-lined chamber for thermal exchange between combustion air and waste furnace gases, a waste furnace gas entrance passage above said chamber, a waste furnace gas exit passage below said chamber, a top tile seal and a bottom tile seal for said chamber, a top baffle tile layer and a bottom baffle tile layer in said chamber adjacent the top and bottom tile seals respectively, the said baffle tile layers and tile seals extending substantially to the side walls of said chamber, and open-ended ducts passing through the chamber connecting the said entrance and exit passages, the said recuperator having a recess between the side walls of said chamber and the outer edges of the tile seals and baffle tile layers, an impervious layer of heat-resistant metal between the top tile seal and top baffle tile layer, and between the bottom tile seal and bottom baffle tile layer, each said metal layer extending into the ceramic side walls of the said chamber and having an expansion bend in the corresponding recess to prevent buckling of said metal layer.

2. In a recuperator having a refractory ceramic-lined chamber for thermal exchange between combustion air and waste furnace gases, a waste furnace gas entrance passage above said chamber, a waste furnace gas exit passage below said chamber, a top tile seal and a bottom tile seal for said chamber, a top baffle tile layer and a bottom baffle tile layer in said chamber adjacent the top and bottom tile seals respectively, the said baffle tile layers and tile seals extending substantially to the side walls of said chamber, and open-ended ducts passing through the chamber connecting the said entrance and exit passages, the said recuperator having a recess between the side walls of said chamber and the outer edges of the tile seals and baffle tile layers, an impervious layer of heat-resistant metal between the top tile seal and top baffle tile layer, and between the bottom tile seal and bottom baffle tile layer, each said metal layer extending into the ceramic side walls of the said chamber and having an expansion bend in the corresponding recess to prevent buckling of said metal layer and having expansion bend means in said metal layer across the ridge formed by said first expansion bend to permit expansion longitudinally of said ridge and to prevent distortion due to changes in temperature.

References Cited in the file of this patent

UNITED STATES PATENTS

| | | |
|---|---|---|
| 360,973 | Schulze-Berge | Apr. 12, 1887 |
| 1,876,401 | Chatfield | Sept. 6, 1932 |
| 1,881,388 | Morton | Oct. 4, 1932 |
| 2,336,879 | Mekler | Dec. 14, 1943 |
| 2,574,738 | Graham et al. | Nov. 13, 1951 |